B. L. ROBERTSON.
GREASE CUP.
APPLICATION FILED JULY 6, 1915.

1,163,461. Patented Dec. 7, 1915.

Bessie L. Robertson, Inventor

By Albert Popkins, Attorney

Witnesses

UNITED STATES PATENT OFFICE.

BESSIE L. ROBERTSON, OF MARION STATION, MARYLAND.

GREASE-CUP.

1,163,461.  Specification of Letters Patent.  Patented Dec. 7, 1915.

Application filed July 6, 1915. Serial No. 38,188.

*To all whom it may concern:*

Be it known that I, BESSIE L. ROBERTSON, a citizen of the United States, residing at Marion Station, in the county of Somerset and State of Maryland, have invented certain new and useful Improvements in Grease-Cups, of which the following is a specification.

This invention relates to grease cups and has special reference to a compression grease cup.

In the flat bottomed construction of grease cups it frequently happens that the grease cups often used require a very considerable amount of force to be exercised in order to expel the grease.

One important object of the invention is to improve the form of the bottom of such grease cups so as to lessen the force required to expel the contents.

In the manufacture of various classes of machinery, especially automobiles, it is at present necessary to carry a large variety of different sizes of grease cups in stock and to carry in each size of grease cups varieties which differ from each other merely in the diameters of the nipples. This also is true in all repair shops and garages especially such places as repair different makes of automobiles.

A second very important object of the invention is to provide a grease cup having a standard nipple and an adapter by which it may be secured to the desired part of the machinery or vehicle.

With the above and other objects in view, as will be hereinafter apparent, the invention consists in general of certain novel details of construction and combinations of parts hereinafter fully described, illustrated in the accompanying drawings and claimed.

Figure 1:
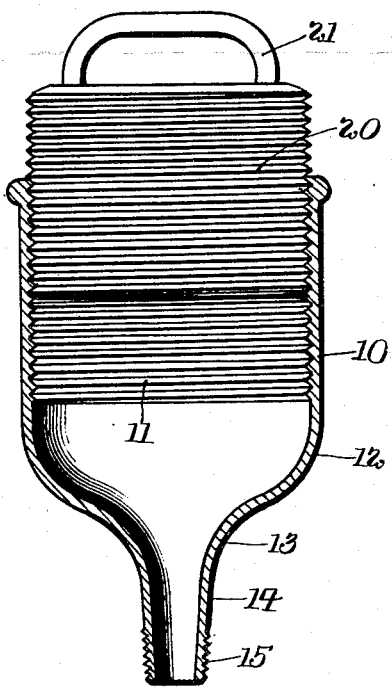
Figure 2:
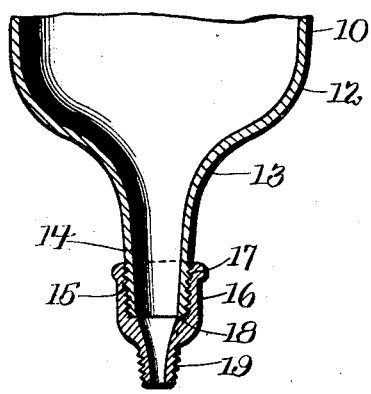
Figure 3:
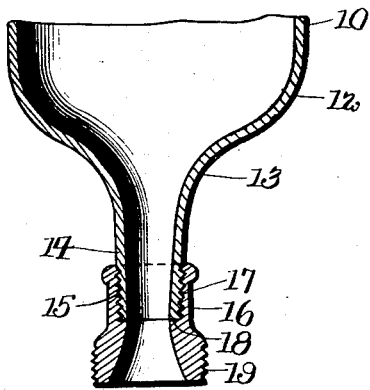

In the accompanying drawings like characters of reference indicate like parts in the several views; and Figure 1 is a vertical median section through a grease cup constructed in accordance with this invention. Fig. 2 is a vertical section through the lower part of such a grease cup fitted with a reducing adapter. Fig. 3 is a view similar to Fig. 2 but showing an enlarging adapter.

The body 10 of the grease cup is of the ordinary cylindrical shape at its upper end and is provided with the usual internal machine screw threads 11. The lower portion of the body is first curved inward as at 12 and then downward as at 13 and terminates in a neck 14 having exterior pipe threads 15. A section through the lower wall of the grease cup is thus formed as an ogee. The pipe threads 15 are always made in one standard size which may, for example be the size necessary to fit the largest connection on the engine or any part of the machine.

In order to arrange for the attachment of the grease cups to different sized connections I employ an adapter which consists of a hollow body 16 threaded interiorly as at 17 to fit the threaded end 15, this threaded portion terminating in an abrupt annular shoulder 18 against which the end of the neck 14 abuts when the parts are assembled. This adapter has its lower end provided with exterior pipe threads 19 and it will be understood that a variety of adapters may be used with any one grease cup so that a number of different sizes or diameters may be given to the threads 19 thus permitting the standard grease cup to be connected to any size of threaded opening.

The grease cup is closed by a threaded follower plug 20 having a manually operable handle 21 so that the plug may be turned without the use of tools.

There has thus been provided a simple and efficient device of the kind described and for the purpose specified.

Having thus described my invention, what I claim as new and desire to secure by Letters Patent, is:—

A compression grease cup having the lower portion reversely curved to form an ogee in section and terminating in a tapered neck having a pipe threaded lower end, in combination with an adapter having a passageway therethrough, the upper end of the passageway having its wall conforming smoothly to the interior wall of the neck, the upper end of the adapter being interiorly threaded to fit the threaded end of the neck, the lower end of said adapter being exteriorly pipe threaded and of a different diameter from the upper pipe threaded portion.

In testimony whereof I affix my signature in the presence of two witnesses.

BESSIE L. ROBERTSON.

Witnesses:
M. KATHRYNE HORSEY,
EDWIN A. ROBINSON.